United States Patent
Ligi, Jr. et al.

(10) Patent No.: US 11,285,787 B2
(45) Date of Patent: Mar. 29, 2022

(54) AIR FLOW CONTROL SYSTEM AND METHOD OF CLIMATE CONTROL FOR AN AUTONOMOUS VEHICLE

(71) Applicant: FORD GLOBAL TECHNOLOGIES, LLC, Dearborn, MI (US)

(72) Inventors: Anthony Ligi, Jr., Chelsea, MI (US); Gary D. Mullen, Plymouth, MI (US); Francis Raymond Gillis, Farmington Hills, MI (US); Steven Nicholas Fidh, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 405 days.

(21) Appl. No.: 15/810,472

(22) Filed: Nov. 13, 2017

(65) Prior Publication Data

US 2019/0143794 A1  May 16, 2019

(51) Int. Cl.
*B60H 1/34* (2006.01)
*B60H 1/00* (2006.01)

(52) U.S. Cl.
CPC ......... *B60H 1/345* (2013.01); *B60H 1/00357* (2013.01); *B60H 1/00742* (2013.01); *B60H 1/00871* (2013.01); *B60H 2001/3485* (2013.01)

(58) Field of Classification Search
CPC ................................................. B60H 1/00642
See application file for complete search history.

(56) References Cited

U.S. PATENT DOCUMENTS

| | | | |
|---|---|---|---|
| 4,559,868 A | 12/1985 | Nonaka et al. | |
| 6,206,442 B1 | 3/2001 | Breunig | |
| 6,431,257 B1 * | 8/2002 | Sano | B60H 1/00064 165/202 |
| 6,554,696 B2 | 4/2003 | Kowalski et al. | |
| 6,840,852 B2 * | 1/2005 | Gehring | B60H 1/3414 454/153 |
| 8,641,489 B2 * | 2/2014 | Dubief | B60H 1/242 454/127 |
| 9,315,090 B2 | 4/2016 | Wittorf | |
| 2006/0090890 A1 * | 5/2006 | Klein | B60H 1/00064 165/203 |
| 2012/0276833 A1 * | 11/2012 | Wittorf | B60H 1/3421 454/155 |
| 2017/0285642 A1 * | 10/2017 | Rander | B60N 2/0244 |
| 2018/0001734 A1 * | 1/2018 | Faust | B60H 1/00064 |

FOREIGN PATENT DOCUMENTS

| | | |
|---|---|---|
| EP | 0911196 B2 | 2/2009 |
| FR | 2819756 A1 | 7/2002 |
| KR | 20140089092 A | 7/2014 |

OTHER PUBLICATIONS

English Machine Translation of FR2819756A1.

* cited by examiner

*Primary Examiner* — Steven B McAllister
*Assistant Examiner* — Elizabeth M. May
(74) *Attorney, Agent, or Firm* — Vichit Chea; Price Heneveld LLP

(57) ABSTRACT

An air flow control system includes a plenum having an air inlet, a first air outlet, a second air outlet and a third air outlet, a vent door, an air guide, carried on the vent door, and an actuator. The actuator displaces the vent door between a first position closing the first air outlet and a second position opening the first air outlet. A climate control method for an autonomous vehicle is also provided.

10 Claims, 5 Drawing Sheets

AIR FLOW CONTROL SYSTEM AND METHOD OF CLIMATE CONTROL FOR AN AUTONOMOUS VEHICLE

TECHNICAL FIELD

This document relates generally to the motor vehicle equipment field and, more particularly, to an air flow control system and a climate control method for an autonomous vehicle.

BACKGROUND

It is anticipated that autonomous vehicles adapted for ride sharing will become a critical component of future transportation systems including, particularly, in the large city, metropolitan area environment. During down time between customer hails, such a vehicle may be located at a charging station recharging the onboard energy storage devices allowing for operation of the autonomous vehicle. Under normal operating conditions it is further anticipated that a ride share autonomous vehicle will spend a substantial amount of residence time without any onboard occupants. In order to conserve energy, the climate control system for the passenger cabin of the motor vehicle will be configured to conserve energy rather than maintain the passenger cabin within a predetermined comfort temperature range for any passenger or occupant of the motor vehicle. However, once the autonomous vehicle has been hailed to pick up a passenger, the climate control system will be configured to rapidly condition the air and bring the air temperature of the passenger cabin within a predetermined comfort temperature range before picking up a passenger in response to that hail. Under certain situations this will require very rapid heating or cooling of the air in the passenger cabin.

This document relates to a new and improved air flow control system which minimizes back pressure and provides a particularly rapid heating or cooling rate until the air temperature in the passenger cabin reaches the predetermined comfort temperature range. At that time, the air flow control system provides for heating and cooling at a second heating or cooling rate adapted to maintain the predetermined comfort temperature range and maximize the comfort of any passenger or occupant of the autonomous vehicle.

SUMMARY

In accordance with the purposes and benefits described herein, a new and improved air flow control system is provided. That air flow control system comprises a plenum, having an air inlet and a first air outlet, a vent door, an air guide carried on the vent door and an actuator displacing the vent door between a first position closing the first air outlet and a second position opening the first air outlet.

The first air inlet may be opposed to the first air outlet. Further, the plenum may include a second air outlet and a third air outlet. The second air outlet may be opposed to the third air outlet. Further, the air inlet and the first air outlet may be aligned on a first axis while the second air outlet and the third air outlet may be aligned on a second axis wherein the first axis is perpendicular to the second axis.

The air guide may have a chevron shape. Further, the air guide may be carried on a first side of the vent door. When the vent door is in the first position, the air guide may be adapted to direct air passing into the plenum from the air conditioning system through the air inlet toward the second air outlet and the third air outlet. In contrast, when the vent door is in the second position, a first portion of the air passing from the plenum through the first air outlet may be directed by the air guide through an air passageway between the air guide and the first side of the vent door, a second portion of the air passing from the plenum through the first air outlet may be directed to a first side of the air passageway and a third portion of the air passing from the plenum through the first air outlet may be directed to a second side of the air passageway.

The air flow control system may further include a controller. That controller may be adapted to controller operation of the actuator and displace the vent door between the first position and the second position. In addition, the air flow control system may further include a passenger cabin occupancy monitoring device. Further, the air flow control system may include (a) a passenger cabin air temperature monitoring device, (b) an ambient air temperature monitoring device or (c) a passenger cabin air temperature monitoring device and an ambient air temperature monitoring device.

The controller may be adapted to displace the vent door to the second position in response to (a) a first signal from the passenger cabin occupancy monitoring device indicating an unoccupied passenger cabin, (b) a hail for a ride and (c) a second signal from the passenger cabin temperature monitoring device indicating a need for maximum heating or cooling to bring an air temperature within the passenger cabin within a predetermined comfort temperature range before picking up a passenger in response to the hail.

Further, the controller may be adapted to displace the vent door to the first position to maintain the air temperature in the predetermined comfort temperature range in response to the air temperature reaching the predetermined comfort temperature range.

In at least one possible embodiment the first air outlet has a first cross sectional area $CA_1$ while the air inlet has a second cross sectional area $CA_2$ where $CA_1 \geq CA_2$. In this way, system back pressure may be minimized to allow for rapid heating and cooling to bring the passenger cabin quickly within the predetermined comfort temperature range while the autonomous vehicle is in transit to pick up a passenger in response to a hail for a ride.

In accordance with an additional aspect, a climate control method for an autonomous vehicle is provided. That method comprises the steps of: (a) opening, by a controller, a first air outlet having a first back pressure $P_1$ to provide a first heating or cooling rate $R_1$ until an air temperature in a passenger cabin of the autonomous vehicle reaches a predetermined comfort temperature range and (b) closing, by the controller the first air outlet and directing air through at least a second air outlet having a second back pressure $P_2$ to provide a second heating or cooling rate $R_2$ in response to the temperature in the passenger cabin reaching the predetermined comfort temperature range where $P_1 < P_2$ and $R_1 > R_2$.

The climate control method may further include the step of configuring the controller to open the first air outlet in response to an unoccupied passenger cabin. The climate control method may further include the step of configuring the controller to open the first air outlet in response to a hail from a future passenger for a ride in the autonomous vehicle.

The climate control method may further include the step of configuring the controller to open the first air outlet in response to a need for maximum heating or cooling to bring the air temperature in the passenger cabin to within a predetermined comfort temperature range for picking up a passenger in response to a hail.

Still further, the climate control method may include the step of configuring the controller to open the first vent opening in response to (a) an unoccupied passenger cabin, (b) a hail for a ride and (c) a need for maximum heating or cooling to bring an air temperature within the passenger cabin within a predetermined comfort temperature range before picking up a passenger in response to the hail.

In the following description, there are shown and described several preferred embodiments of the air flow control system and the related climate control method for an autonomous vehicle. As it should be realized, the air flow control system and climate control method are capable of other, different embodiments and their several details are capable of modification in various, obvious aspects all without departing from the air flow control system and climate control method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the air flow control system and related climate control method for an autonomous vehicle and together with the description serve to explain certain principles thereof.

Figure 1:
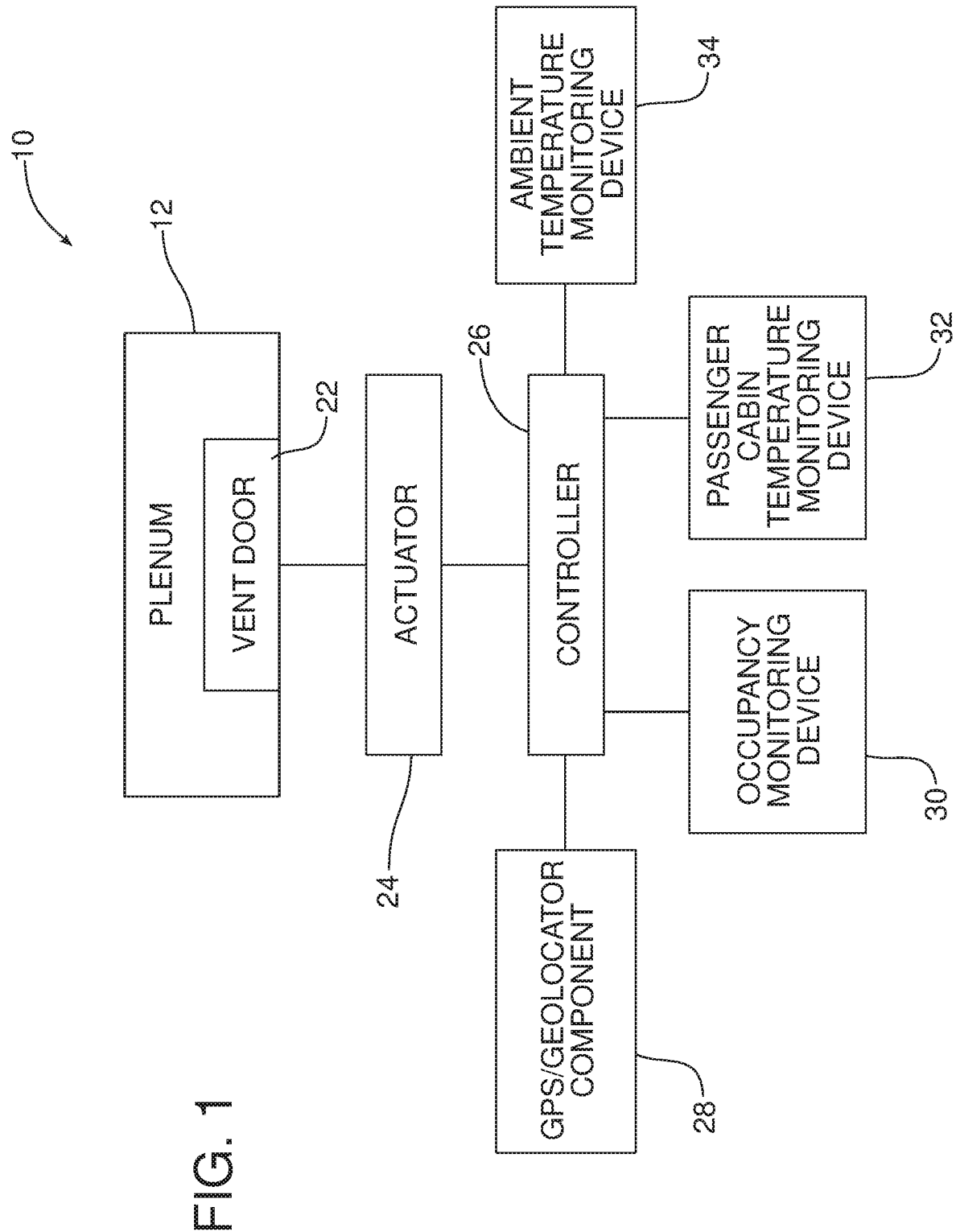
FIG. 1 is a schematic block diagram of the air flow control system.

Reference will now be made in detail to the present preferred embodiments of the air flow control system and related climate control method for an autonomous vehicle, examples of which are illustrated in the accompanying drawing figures.

DETAILED DESCRIPTION

Reference is now made to the drawing figures which illustrate the new and improved air flow control system 10. That air flow control system 10 is useful in substantially any type of motor vehicle adapted for hauling passengers and is particularly adapted for use in an autonomous vehicle configured to function as a ride share vehicle. Such an autonomous vehicle may be hailed by a potential passenger at any time. After receiving such a hail the autonomous vehicle will pick up the passenger and take the passenger to the desired destination.

Figure 2A:
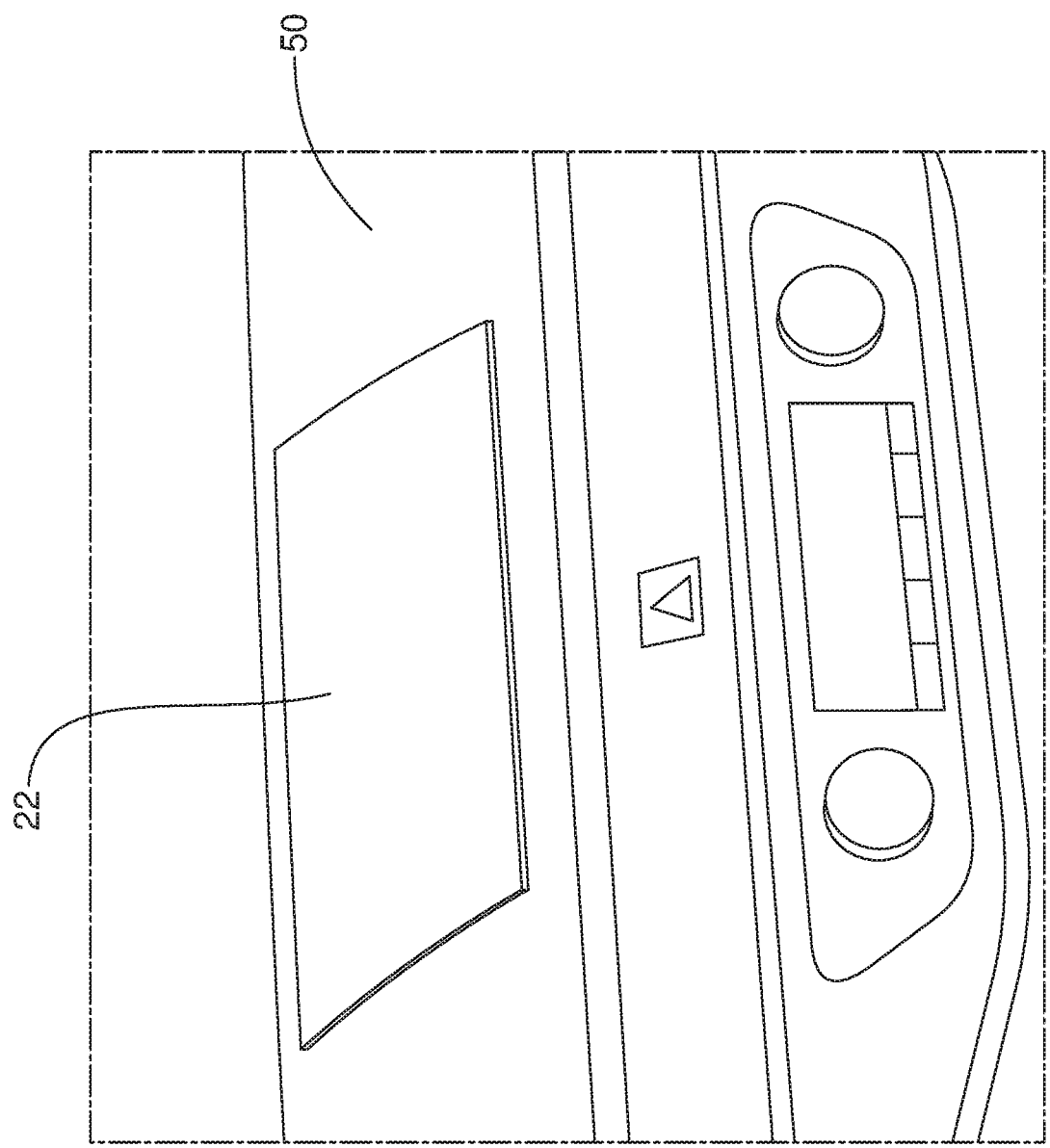
FIG. 2a is a schematic illustration of the vent door of the air flow control system wherein the vent door is located on the dashboard or instrument panel and is in a first position closing a first air outlet.
Figure 2B:
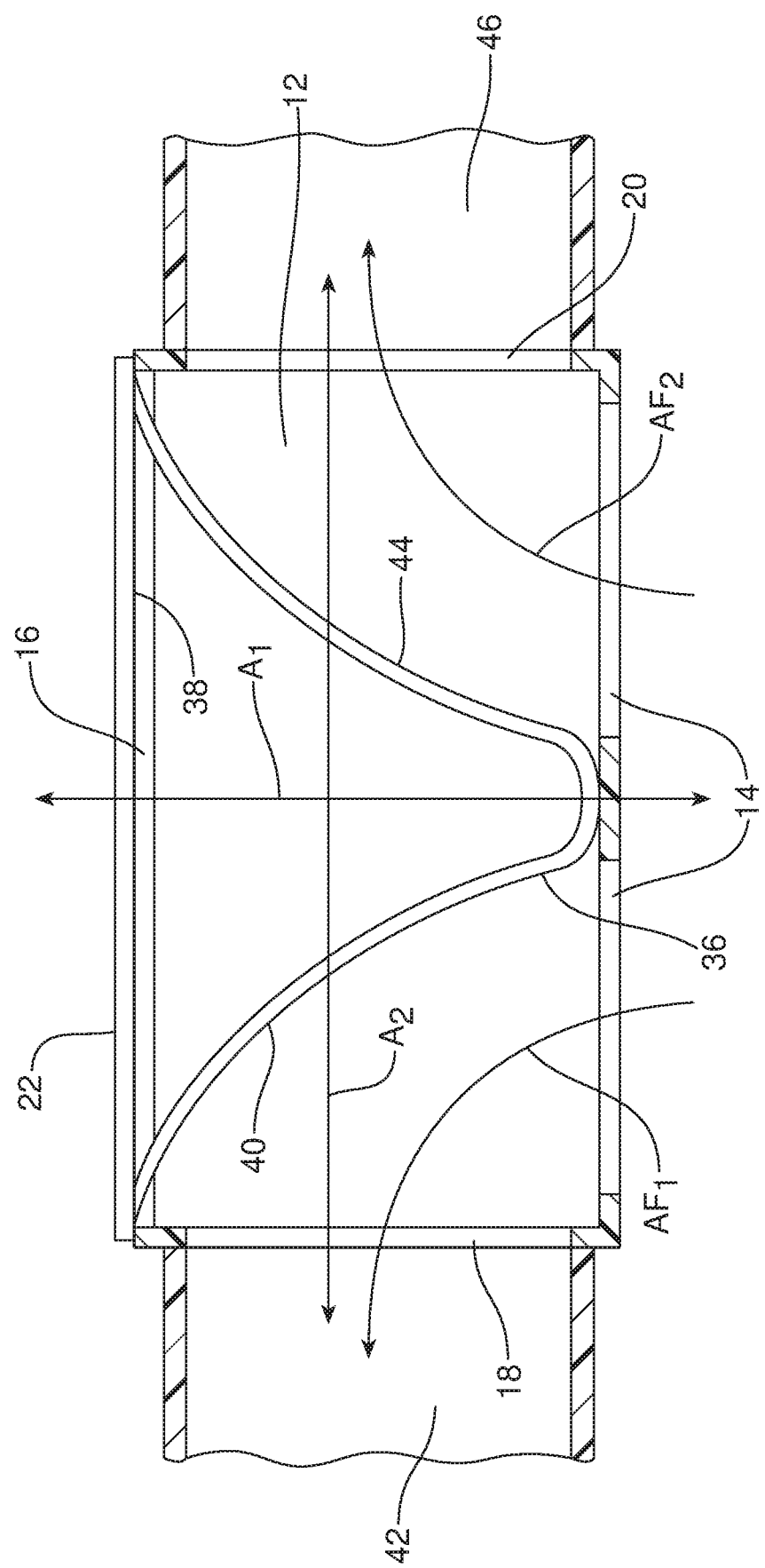
FIG. 2b is a schematic illustration of the air flow control system with the vent door in the first position and showing the resulting air flow.

As schematically illustrated in FIGS. 1, 2a and 2b, the air flow control system 10 includes a plenum 12 having an air inlet 14 for receiving conditioned air from the climate control system of the motor vehicle, a first air outlet 16, a second air outlet 18, and a third air outlet 20. In the illustrated embodiment, the air inlet 14 is opposed to the first air outlet 16 and the second air outlet 18 is opposed to the third air outlet 20.

More specifically, in the illustrated embodiment the air inlet 14 and the first air outlet 16 are aligned on a first axis $A_1$ while the second air outlet 18 and the third air outlet 20 are aligned on a second axis $A_2$ wherein the first axis is perpendicular to the second axis. Still more specifically, the first axis $A_1$ is generally in the vertical or along the Z axis of the autonomous vehicle while the second axis $A_2$ is generally aligned with the lateral or Y axis of the autonomous vehicle as per the SAE vehicle axis system.

The air flow control system 10 also includes a vent door 22 and an actuator 24 for displacing the vent door between a first position, closing the first air outlet 16, and a second position opening the first air outlet. The actuator 24 may comprise any type of actuator suited for displacing the vent door 22 between the first and second positions that close and open the first air outlet 16.

The air flow control system 10 also includes a controller 26 adapted to control the operation of the actuator 24 to selectively displace the vent door 22 between the first position and the second position. The controller 26 may comprise a computing device such as a dedicated microprocessor or an electronic control unit (ECU) operating in accordance with instructions from appropriate control software. Thus, the controller 26 may comprise one or more processors, one or more memories and one or more network interfaces all in communication with each other over a communication bus.

The air flow control system 10 may also include various devices that provide data to the controller 26 respecting various environmental conditions and operating parameters associated with the air flow control system 10 and the autonomous vehicle. Those various devices may include, but are not necessarily limited to those illustrated in FIG. 1 including a GPS/GeoLocator component 28, an occupancy monitoring device 30, a passenger cabin air temperature monitoring device 32 and an ambient air temperature monitoring device 34.

More specifically, the GPS/GeoLocator component 28 may be of a type known in the art for determining the current position of the autonomous vehicle. The occupancy monitoring device 30 may comprise a weight sensor at each seating position in the autonomous vehicle, a camera or any other device that may function to monitor the occupancy of the passenger cabin of the autonomous vehicle.

The passenger cabin air temperature monitoring device 32 may comprise any device capable of monitoring the air temperature within the passenger cabin. The ambient air temperature monitoring device 34 may comprise any device capable of monitoring the ambient air temperature of the environment in which the autonomous vehicle is operating. The GPS/GeoLocator component 28, the occupancy monitoring device 30, the passenger cabin air temperature monitoring device 32, the ambient air temperature monitoring device 34 and substantially any other monitoring device suited for providing appropriate operating data or information to the air flow control system 10 are all connected to provide data signals to the controller 26.

In one of many possible embodiments, the controller 26 is adapted to control operation of the actuator 24 and displace the vent door 22 to the second position in response to (a) a first signal from the passenger cabin occupancy monitoring device 30 indicating an unoccupied passenger cabin, (b) the receipt of a hail from a potential passenger requesting a ride in the autonomous vehicle to a particular location and communicated to the controller via a wireless communication network and (c) a second signal from the temperature monitoring device 32 indicating a need for maximum heating or cooling to bring the air temperature within the passenger cabin within a predetermined comfort temperature range before picking up the passenger in response to the hail.

Toward this end, the controller 26 will use data from the GPS/GeoLocator component 28 indicating the current position of the autonomous vehicle and the given location where the autonomous vehicle will pick up the passenger in response to the hail, as well as current traffic conditions and current weather conditions obtained by wireless communication from appropriate information networks and street information from travel databases to determine an estimated time by which the autonomous vehicle will pick up the passenger in response to the hail. This establishes the controller estimated amount of time the air flow control system 10 has available to bring the air temperature of the passenger cabin of the autonomous vehicle within a predetermined comfort temperature range before picking up the passenger in response to the hail. In certain situations, maximum heating or cooling will be required to meet this goal.

As best illustrated in FIGS. 2a, 2b, 3a and 3b, an air guide 36 is carried on a first or inner side 38 of the vent door 22. In the illustrated embodiment, the air guide 36 has a chevron shape. As best illustrated in FIGS. 2a and 2b, when the vent door 22 is in the first position closing the first air outlet 16 of the plenum 12, the air guide 36 directs air from the climate control system passing into the plenum 12 through the air inlet 14 toward the second air outlet 18 and the third air outlet 20. More specifically, a first portion of that air $AF_1$ is directed by a first face 40 of the air guide 36 through the second air outlet 18 into a first air duct 42. At the same time a second portion of the air stream $AF_2$ is directed by a second face 44 through the third air outlet 20 into a second duct 46. The first and second ducts 42, 46 lead downstream to vent registers (not shown) that direct air at particular locations specifically adapted to maintain the comfort of passengers in the motor vehicle. Thus, for example, the vent registers may be directed to passengers at the various seating locations within the motor vehicle. In order to reach those positions, the first duct 42 and the second duct 46 are likely to be directed through the A pillars between the windshield and the front side windows of the motor vehicle, along the headliner and/or along the rocker panels at the sides of the motor vehicle beneath the door openings where packaging space functions to constrict the effective cross sectional area of the first and second ducts creating a back pressure in the air flow control system that limits the heating and cooling efficiency.

Figure 3A:
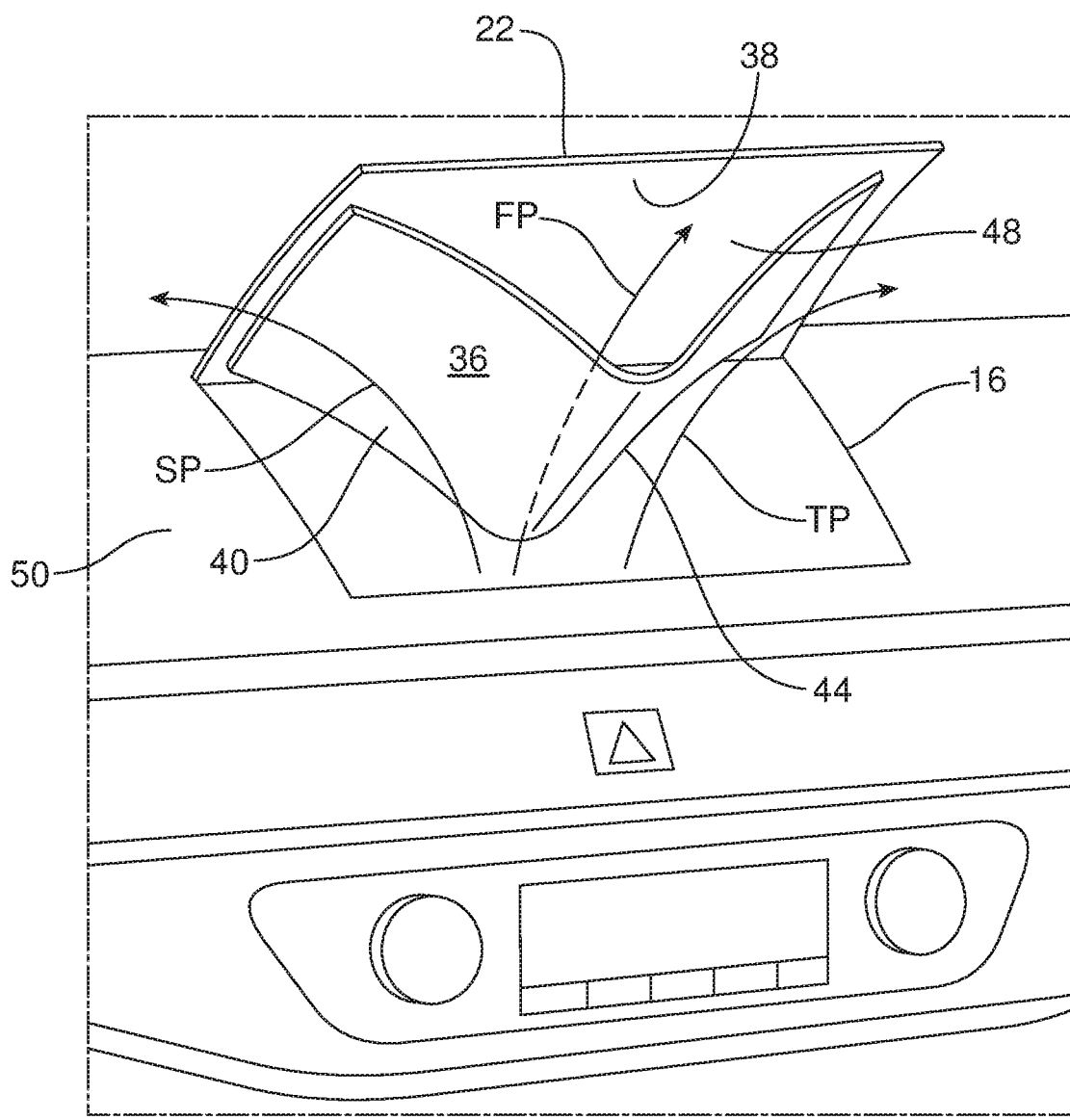
FIG. 3a is a view similar to FIG. 2a but illustrating the vent door in a second position opening the first air outlet at the top of the dashboard or instrument panel.
Figure 3B:
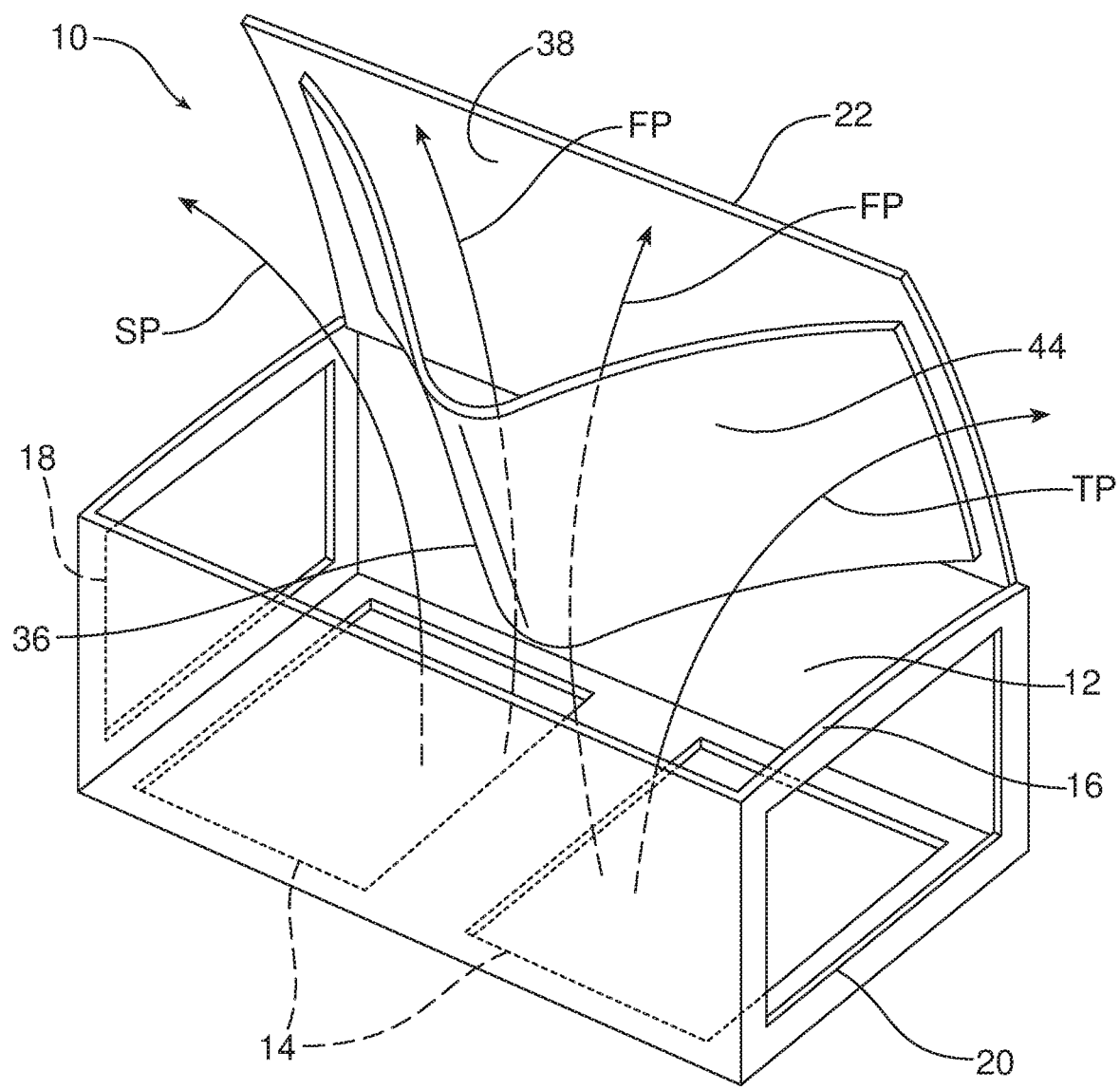
FIG. 3b is a view further illustrating air flow when the vent door is in the second position.

In contrast, as illustrated in FIGS. 3a and 3b, when the vent door 22 is in the second position opening the first air outlet 16, a first portion of the air FP passing from the plenum 12 through the first air outlet 16 is directed upward from the instrument panel/dashboard 50 through the air passageway 48 between the air guide 36 and the first side 38 of the vent door. A second portion SP of the air passing from the plenum 12 through the first air outlet 16 is directed to a first side of the air passageway 48 and motor vehicle by the first face 40 of the air guide 36 and a third portion TP of the air passing from the plenum through the first air outlet is directed by the second face 44 of the air guide to a second side of the air passageway in the motor vehicle.

Thus, it should be appreciated that when maximum heating and cooling is desired, the controller 26 is adapted to displace the vent door 22 to the second position and thereby deliver the maximum amount of conditioned air through the first air outlet 16 upwardly from the instrument panel/dashboard 50. Toward this end the first air outlet 16 may have a first cross sectional area $CA_1$ while the air inlet 14 has a second cross sectional area $CA_2$ where $CA_1 \geq CA_2$. In this way, the first air outlet 16 essentially eliminates any back pressure that would otherwise restrict the heating or cooling efficiency of the air flow control system thereby heating or cooling the passenger cabin in the most rapid manner possible without regard to providing heating or cooling directed to the seating position. By bypassing the first duct 42 and second duct 46 of the air flow control system fed by the second air outlet 18 and the third air outlet 20, inefficiencies introduced by back pressure inherent in those ducts is advantageously avoided. Thus a maximum heating and cooling rate $R_1$ is established and maintained when the autonomous vehicle is free of occupants and a limited amount of time exists to bring the air temperature within the passenger compartment to a predetermined comfort temperature range.

In contrast, once that predetermined comfort temperature range has been established and passengers or occupants are seated in the autonomous vehicle, the controller 26 is adapted to displace the vent door 22 to the first position, closing the first air outlet 16. In this position, the air guide 36 directs the air flow from the plenum through the second and third air outlets 18, 20 into the first and second ducts 42, 46 that deliver air to the vent registers (not shown) whereby that air is directed onto the passengers or occupants of the motor vehicle resting in the seating positions. In this way the air flow control system functions to maintain the air temperature in the passenger cabin in the predetermined comfort temperature range desired by the motor vehicle passengers/occupants.

Consistent with the above description, a new and improved climate control method is provided for an autonomous vehicle. That method comprises the steps of: (a) opening, by the controller 26, the first air outlet 16 having a first back pressure $P_1$ to provide a first heating or cooling rate $R_1$ until the air temperature in the passenger cabin of the autonomous vehicle reaches a predetermined comfort temperature range and (b) closing, by the controller 26, the first air outlet and directing air through the at least a second air outlet 18 (and in the illustrated embodiment a third air outlet 20) having a second back pressure $P_2$ to provide a second heating or cooling rate $R_2$ in response to the air temperature in the passenger cabin reaching the predetermined comfort temperature range where $P_1 < P_2$ and $R_1 > R_2$.

The climate control method may further include the step of configuring the controller 26 to open the first air outlet 16 in response to an unoccupied passenger cabin. Alternatively or in addition, the climate control method may further include the step of configuring the controller 26 to open the first air outlet 16 in response to a hail for a ride from a future passenger. Alternatively, or in addition, the climate control method may further include the step of configuring the controller 26 to open the first air outlet 16 in response to a need for maximum heating or cooling to bring the air temperature in the passenger cabin to within a predetermined comfort temperature range before picking up a passenger in response to a hail. Thus, the climate control method may include the step of configuring the controller 26 to open the first air outlet 16 in response to (a) an unoccupied passenger cabin (as detected by the occupancy monitoring device 30), (b) a hail for a ride and (c) a need for maximum heating or cooling to bring an air temperature within the passenger cabin within a predetermined comfort temperature range before picking up a passenger in response to the hail.

The foregoing has been presented for purposes of illustration and description. It is not intended to be exhaustive or to limit the embodiments to the precise form disclosed. Obvious modifications and variations are possible in light of the above teachings. For example, while the embodiment of the air flow control system illustrated and described in this document is provided in the instrument panel/dashboard 50, it may be provided at other locations such as a console or from part of an auxiliary climate control system. All such modifications and variations are within the scope of the appended claims when interpreted in accordance with the breadth to which they are fairly, legally and equitably entitled.

What is claimed:

1. An air flow control system, comprising:
    a plenum having an air inlet and a first air outlet, a second air outlet and a third air outlet wherein said air inlet is opposed to said first air outlet, said second air outlet is opposed to and facing toward said third air outlet, said air inlet and said first air outlet are aligned on a first axis; and
    a first airflow path provided by said second air outlet and a second airflow path provided by said third air outlet are aligned on a second axis wherein said first axis is perpendicular to said second axis, and wherein the first air outlet is at least partially defined by a dashboard of a vehicle;
    a vent door;
    an air guide carried on said vent door;
    an air passageway between said air guide and a first side of said vent door, and
    an actuator displacing said vent door between a first position closing said first air outlet and a second position opening said first air outlet,
    wherein when said vent door is in said first position said vent door is generally coplanar with a top surface of the dashboard and when said vent door is in said second position said vent door is generally distal from the top surface of the dashboard, and
    wherein when said vent door is in said first position said air guide directs air passing into said plenum through said air inlet toward said second air outlet and said third air outlet, and
    wherein when said vent door is in said second position, a first portion of air passing from said plenum through said first air outlet is directed by said air guide through said air passageway, a second portion of said air passing from said plenum through said first air outlet is directed to a first side of said air passageway and a third portion of said air passing from said plenum through said first air outlet is directed to a second side of said air passageway, and
    wherein the first portion of air, the second portion of air, and the third portion of air are subsequently directed into a cabin of the vehicle.

2. The air flow control system of claim 1, wherein said air guide has a chevron shape.

3. The air flow control system of claim 1, further including a controller adapted to control operation of said actuator and displace said vent door between said first position and said second position.

4. The air flow control system of claim 3, further including a passenger cabin occupancy monitoring device.

5. The air flow control system of claim 4, further including (a) a passenger cabin air temperature monitoring device, (b) an ambient air temperature monitoring device or (c) said passenger cabin air temperature monitoring device and said ambient air temperature monitoring device.

6. The air flow control system of claim 4, further including a passenger cabin air temperature monitoring device wherein said controller is adapted to displace said vent door to said second position in response to (a) a first signal from said passenger cabin occupancy monitoring device indicating an unoccupied passenger cabin, (b) a hail for a ride and (c) a second signal from said passenger cabin air temperature monitoring device indicating a need for maximum heating or cooling to bring an air temperature within said passenger cabin within a predetermined comfort temperature range before picking up a passenger in response to said hail.

7. The air flow control system of claim 6, wherein said controller is adapted to displace said vent door to said first position to maintain said air temperature in said predetermined comfort temperature range in response to said air temperature reaching said predetermined comfort temperature range.

8. The air flow control system of claim 7, wherein said first air outlet has a first cross sectional area $CA_1$ and said air inlet has a second cross sectional area $CA_2$ where $CA_1 \geq CA_2$.

9. The airflow control system of claim 1, wherein the first portion of air follows a third airflow path provided by the first air outlet and translated through the air passageway, wherein the third airflow path is perpendicular to at least the first airflow path and the second airflow path.

10. The airflow control system of claim 9, further comprising a first duct proximate the second air outlet and opposed to a second duct that is proximate the third air outlet, wherein the first airflow path travels from the second air outlet and through the first duct, and the second airflow path travels from the third air outlet and through second duct, and wherein the first airflow path is perpendicular to the third airflow path prior to traveling through the first duct and the second airflow path is perpendicular to the third airflow path prior to traveling through the second duct.

* * * * *